(12) United States Patent
Cleary et al.

(10) Patent No.: US 9,908,805 B2
(45) Date of Patent: Mar. 6, 2018

(54) METHOD FOR LOCALIZED ANNEALING OF CHEMICALLY STRENGTHENED GLASS

(71) Applicant: CORNING INCORPORATED, Corning, NY (US)

(72) Inventors: Thomas Michael Cleary, Elmira, NY (US); Mark Stephen Friske, Campbell, NY (US); Robert Stephen Wagner, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 44 days.

(21) Appl. No.: 14/913,890

(22) PCT Filed: Aug. 21, 2014

(86) PCT No.: PCT/US2014/052037
§ 371 (c)(1),
(2) Date: Feb. 23, 2016

(87) PCT Pub. No.: WO2015/031151
PCT Pub. Date: Mar. 5, 2015

(65) Prior Publication Data
US 2016/0207820 A1    Jul. 21, 2016

Related U.S. Application Data

(60) Provisional application No. 61/869,962, filed on Aug. 26, 2013.

(51) Int. Cl.
*C03B 25/08* (2006.01)
*B32B 17/10* (2006.01)
(Continued)

(52) U.S. Cl.
CPC .......... *C03B 25/08* (2013.01); *B32B 17/1077* (2013.01); *B32B 17/10091* (2013.01);
(Continued)

(58) Field of Classification Search
None
See application file for complete search history.

(56) References Cited

U.S. PATENT DOCUMENTS

| 4,483,700 A | 11/1984 | Forker, Jr. et al. |
| 5,614,382 A | 3/1997 | Metcalf |

(Continued)

FOREIGN PATENT DOCUMENTS

| CN | 102992601 A | 3/2013 | |
| CN | 102992601 B | * 5/2015 | ............. C03B 32/00 |

(Continued)

OTHER PUBLICATIONS

Liguo (CN 102992601 B) (May 13, 2015) (Google Patenets—Machine Translation to English).*

(Continued)

*Primary Examiner* — David Sample
*Assistant Examiner* — Donald M Flores, Jr.
(74) *Attorney, Agent, or Firm* — F. Brock Riggs

(57) ABSTRACT

A method of providing locally annealed regions for a glass article comprising: (a) providing a strengthened glass article having a first surface compressive stress and a first depth of layer of compressive stress; (b) targeting first portions of the glass article on a first side thereof; (c) annealing the targeted first portions to a second surface compressive stress and a second depth of layer of compressive stress; and (d) repeating steps (b) and (c) to create a pattern of annealed portions of the glass article on the first side thereof. Targeted annealing can be done e.g. by focusing a laser or using microwave energy or an induction source. A method for making a laminate structure comprising a first glass layer (12), a second glass layer (16), and at least one polymer interlayer (14) intermediate the first and second glass layers. The first glass layer (12) can be comprised of a strengthened glass (Continued)

having a first portion with a first surface compressive stress and a first depth of layer of compressive stress and a second portion with a second surface compressive stress and a second depth of layer of compressive stress. In other embodiments, the second glass layer (16) can be comprised of a strengthened glass having a third portion with a third surface compressive stress and a third depth of layer of compressive stress and a fourth portion with a fourth surface compressive stress and a fourth depth of layer of compressive stress.

18 Claims, 5 Drawing Sheets

(51) Int. Cl.
 C03C 23/00 (2006.01)
 C03C 21/00 (2006.01)
(52) U.S. Cl.
 CPC .. *B32B 17/10137* (2013.01); *B32B 17/10743* (2013.01); *B32B 17/10761* (2013.01); *B32B 17/10788* (2013.01); *C03C 21/00* (2013.01); *C03C 23/0025* (2013.01); *C03C 23/0065* (2013.01); *B32B 2605/00* (2013.01)

(56) References Cited

U.S. PATENT DOCUMENTS

| | | | |
|---|---|---|---|
| 5,674,790 | A | 10/1997 | Araujo |
| 7,508,406 | B2 | 3/2009 | Oehrlein |
| 7,666,511 | B2 | 2/2010 | Ellison et al. |
| 7,955,605 | B2 | 6/2011 | Prasad |
| 8,986,072 | B2 | 3/2015 | Darcangelo et al. |
| 2012/0094084 | A1* | 4/2012 | Fisher ............... B32B 17/10036 428/174 |
| 2012/0236477 | A1* | 9/2012 | Weber .................. C03C 21/003 361/679.01 |
| 2012/0328843 | A1 | 12/2012 | Cleary et al. |
| 2013/0086948 | A1 | 4/2013 | Bisson et al. |
| 2013/0125589 | A1 | 5/2013 | Dannoux et al. |
| 2013/0125592 | A1 | 5/2013 | Bisson et al. |
| 2013/0127202 | A1 | 5/2013 | Hart |
| 2013/0295357 | A1 | 11/2013 | Cleary et al. |
| 2013/0319046 | A1 | 12/2013 | Cleary et al. |
| 2013/0323415 | A1 | 12/2013 | Brackley et al. |
| 2014/0087159 | A1 | 3/2014 | Cleary et al. |
| 2014/0087193 | A1 | 3/2014 | Cites et al. |
| 2014/0141217 | A1 | 5/2014 | Gulati et al. |
| 2014/0239034 | A1 | 8/2014 | Cleary et al. |
| 2014/0356604 | A1 | 12/2014 | Borrelli et al. |
| 2015/0064374 | A1 | 3/2015 | Jain et al. |
| 2015/0111016 | A1 | 4/2015 | Fisher et al. |
| 2015/0122406 | A1 | 5/2015 | Fisher et al. |
| 2015/0132538 | A1 | 5/2015 | Cleary et al. |
| 2015/0140301 | A1 | 5/2015 | Fisher et al. |
| 2015/0158275 | A1 | 6/2015 | D'Errico et al. |
| 2015/0158277 | A1 | 6/2015 | Fisher et al. |
| 2015/0232366 | A1 | 8/2015 | Fredholm et al. |
| 2015/0232367 | A1 | 8/2015 | Joubaud et al. |
| 2015/0251377 | A1 | 9/2015 | Cleary et al. |
| 2015/0274571 | A1 | 10/2015 | Brennan et al. |
| 2015/0321940 | A1 | 11/2015 | Dannoux et al. |
| 2016/0082705 | A1 | 3/2016 | Fisher et al. |
| 2016/0145139 | A1 | 5/2016 | Fredholm et al. |

FOREIGN PATENT DOCUMENTS

| | | |
|---|---|---|
| DE | 19948655 C1 | 7/2001 |
| EP | 1215039 A2 | 6/2002 |
| FR | 1510240 | 1/1968 |
| WO | 2002007967 A1 | 1/2002 |
| WO | 03068698 A1 | 8/2003 |
| WO | 2011105991 | 9/2011 |
| WO | 2013054059 A1 | 4/2013 |
| WO | 2015031148 A1 | 3/2015 |
| WO | 2015031151 A1 | 3/2015 |
| WO | 2015031594 A2 | 3/2015 |
| WO | 2015054112 A1 | 4/2015 |

OTHER PUBLICATIONS

Laser Photonices, Inc., Press Release, 4 pages, Jan. 22, 2009.
Patent Cooperation Treaty International Notification of Transmittal of the International Search Report and the Written Opinion of the International Searching Authority, International application No. PCT/US2014/052037: dated Nov. 21, 2014, 20 pages.

* cited by examiner

METHOD FOR LOCALIZED ANNEALING OF CHEMICALLY STRENGTHENED GLASS

This application claims the benefit of priority under 35 U.S.C. § 365 of International Patent Application Serial No. PCT/US14/52037 filed on Aug. 21, 2014, which in turn, claims the benefit of priority to U.S. Provisional Application 61/869,962 filed Aug. 26, 2013, the contents of which are incorporated herein by reference in their entirety.

BACKGROUND

Glass laminates can be used as windows and glazing in architectural and vehicle or transportation applications, including automobiles, rolling stock, locomotive and airplanes. Glass laminates can also be used as glass panels in balustrades and stairs, and as decorative panels or coverings for walls, columns, elevator cabs, kitchen appliances and other applications. As used herein, a glazing or a laminated glass structure can be a transparent, semi-transparent, translucent or opaque part of a window, panel, wall, enclosure, sign or other structure. Common types of glazing that are used in architectural and/or vehicular applications include clear and tinted laminated glass structures.

Conventional automotive glazing constructions include two plies of 2 mm soda lime glass with a polyvinyl butyral (PVB) interlayer. These laminate constructions have certain advantages, including low cost and a sufficient impact resistance for automotive and other applications. However, because of their limited impact resistance and higher weight, these laminates exhibit poor performance characteristics, including a higher probability of breakage when struck by roadside debris, vandals and other objects of impact as well as well as lower fuel efficiencies for a respective vehicle.

In applications where strength is important (such as the above automotive application), the strength of conventional glass can be enhanced by several methods, including coatings, thermal tempering, and chemical strengthening (ion exchange). Thermal tempering is conventionally employed in such applications with thick, monolithic glass sheets, and has the advantage of creating a thick compressive layer through the glass surface, typically 20 to 25% of the overall glass thickness. The magnitude of the compressive stress is relatively low, however, typically less than 100 MPa. Furthermore, thermal tempering becomes increasingly ineffective for relatively thin glass, e.g., less than about 2 mm.

In contrast, ion exchange (IX) techniques can produce high levels of compressive stress in the treated glass, as high as about 1000 MPa at the surface, and is suitable for very thin glass. Ion exchange techniques, however, can be limited to relatively shallow compressive layers, typically on the order of tens of micrometers. This high compressive stress can result in very high blunt impact resistance, which might not pass particular safety standards for automotive applications, such as the ECE (UN Economic Commission for Europe) R43 Head Form Impact Test, where glass is required to break at a certain impact load to prevent injury. Conventional research and development efforts have been focused on controlled or preferential breakage of vehicular laminates at the expense of the impact resistance thereof.

For certain automobile glazings or laminates, e.g., windshields and the like, the materials employed therein must pass a number of safety criteria, such as the ECE R43 Head Form Impact Test. If a product does not break under the defined conditions of the test, the product would not be acceptable for safety reasons. This is one reason why windshields are conventionally made of laminated annealed glass rather than tempered glass.

Tempered glass (both thermally tempered and chemically tempered) has the advantage of being more resistant to breakage which can be desirable to enhance the reliability of laminated automobile glazing. In particular, thin, chemically-tempered glass can be desirable for use in making strong, lighter-weight auto glazing. Conventional laminated glass made with such tempered glass, however, does not meet the head-impact safety requirements. One method of forming a thin, chemically-tempered glass compliant with head-impact safety requirements can be to perform a thermal annealing process after the glass is chemically-tempered. This has the effect of reducing compressive stress of the glass thereby reducing the stress required to cause the glass to break. A disadvantage of this method is the reduction of compressive stress occurs in all areas of the glass product rather than in the area of the glass where the head impact is most likely to occur.

Thus, there is a need to perform localized annealing in controlled areas of the glass whereby a resulting product would retain its strength in critical areas, e.g., near the edges thereof, and be weakened in the areas important to occupant safety.

SUMMARY

The embodiments disclosed herein generally relate to methods for producing ion exchanged glass, e.g., glass having characteristics of moderate compressive stress, high depth of compressive layer, and/or desirable central tension. Additional embodiments provide automobile glazings or laminates having laminated, tempered glass.

In accordance with one or more embodiments herein, methods and apparatus provide for a thin glass article having a layer of surface compression from ion exchange techniques which enables scratch and impact resistance. The glass article can also exhibit a relatively high depth of compressive layer (DOL), making it resistant to environmental damage. Notably, the compressive stress (CS) at the glass surface in certain areas can be lower than in traditional ion exchanged glass, which allows the glass to pass automotive impact safety standards (such as the ECE R43 head form impact test) and is therefore suitable for automotive glazing applications.

Additional embodiments provide an exemplary method to cause a directed thermal annealing and thereby local weakening of a thermally-tempered or chemically-tempered glass article. One exemplary embodiment utilizes a laser for such directed thermal annealing whereby the laser locally heats the glass sufficiently to cause thermal annealing, but laser exposure is managed to limit cracking or other physical damage to the glass. A further exemplary embodiment includes a directed microwave or induction heating to create a desirable localized thermal annealing.

Some embodiments of the present disclosure provide a method of providing locally annealed regions for a glass article. The method includes providing a strengthened glass article having a first surface compressive stress and a first depth of layer of compressive stress and targeting first portions of the glass article on a first side thereof. The method also includes annealing the targeted first portions to a second surface compressive stress and a second depth of layer of compressive stress and repeating steps the targeting and annealing to create a pattern of annealed portions of the glass article on the first side thereof.

Additional embodiments of the present disclosure provide a laminate structure having a first glass layer, a second glass layer, and at least one polymer interlayer intermediate the first and second glass layers. The first glass layer can be comprised of a strengthened glass having a first portion with a first surface compressive stress and a first depth of layer of compressive stress and a second portion with a second surface compressive stress and a second depth of layer of compressive stress.

Further embodiments of the present disclosure provide a laminate structure having a first glass layer, a second glass layer, and at least one polymer interlayer intermediate the first and second glass layers. The first glass layer can be comprised of a strengthened glass having a first portion with a first surface compressive stress and a first depth of layer of compressive stress and a second portion with a second surface compressive stress and a second depth of layer of compressive stress. The second glass layer can be comprised of a strengthened glass having a third portion with a third surface compressive stress and a third depth of layer of compressive stress and a fourth portion with a fourth surface compressive stress and a fourth depth of layer of compressive stress.

It is to be understood that both the foregoing general description and the following detailed description present embodiments of the present disclosure, and are intended to provide an overview or framework for understanding the nature and character of the claimed subject matter. The accompanying drawings are included to provide a further understanding of the present disclosure, and are incorporated into and constitute a part of this specification. The drawings illustrate various embodiments and together with the description serve to explain the principles and operations of the claimed subject matter.

BRIEF DESCRIPTION OF THE DRAWINGS

For the purposes of illustration, there are forms shown in the drawings that are presently preferred, it being understood, however, that the embodiments disclosed and discussed herein are not limited to the precise arrangements and instrumentalities shown.

DETAILED DESCRIPTION

Figure 1:
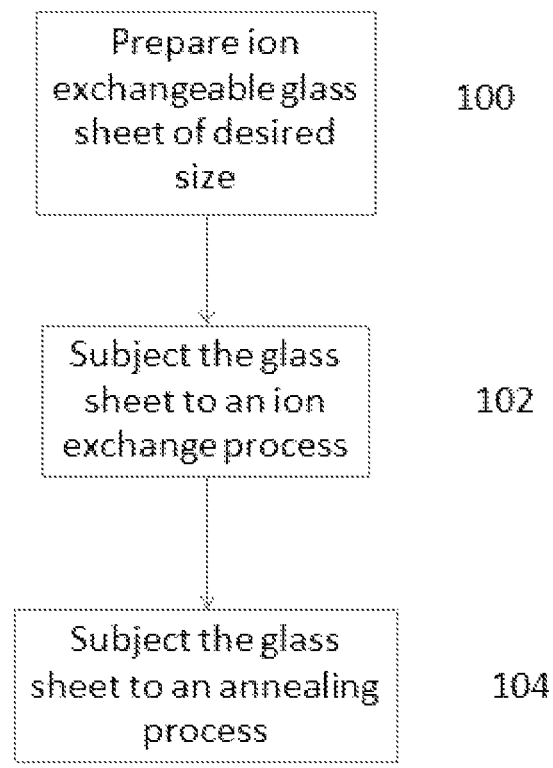
FIG. 1 is a flow diagram illustrating some embodiments of the present disclosure.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other.

Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," and "an," and the corresponding definite article "the" mean "at least one" or "one or more," unless otherwise specified The following description of the present disclosure is provided as an enabling teaching thereof and its best, currently-known embodiment. Those skilled in the art will recognize that many changes can be made to the embodiment described herein while still obtaining the beneficial results of the present disclosure. It will also be apparent that some of the desired benefits of the present disclosure can be obtained by selecting some of the features of the present disclosure without utilizing other features. Accordingly, those of ordinary skill in the art will recognize that many modifications and adaptations of the present disclosure are possible and can even be desirable in certain circumstances and are part of the present disclosure. Thus, the following description is provided as illustrative of the principles of the present disclosure and not in limitation thereof.

Those skilled in the art will appreciate that many modifications to the exemplary embodiments described herein are possible without departing from the spirit and scope of the present disclosure. Thus, the description is not intended and should not be construed to be limited to the examples given but should be granted the full breadth of protection afforded by the appended claims and equivalents thereto. In addition, it is possible to use some of the features of the present disclosure without the corresponding use of other features. Accordingly, the foregoing description of exemplary or illustrative embodiments is provided for the purpose of illustrating the principles of the present disclosure and not in limitation thereof and can include modification thereto and permutations thereof.

FIG. 1 is a flow diagram illustrating some embodiments of the present disclosure. With reference to FIG. 1, some embodiments include the application of one or more processes for producing a relatively thin glass sheet (on the order of about 2 mm or less) having certain characteristics, such as relatively moderate compressive stress (CS), relatively high depth of compressive layer (DOL), and/or moderate central tension (CT). The process includes preparing a glass sheet capable of ion exchange (step 100). The glass sheet can then be subjected to an ion exchange process (step 102), and thereafter the glass sheet can be subjected to an anneal process (step 104).

The ion exchange process 102 can involve subjecting the glass sheet to a molten salt bath including $KNO_3$, preferably relatively pure $KNO_3$ for one or more first temperatures within the range of about 400-500° C. and/or for a first time period within the range of about 1-24 hours, such as, but not limited to, about 8 hours. It is noted that other salt bath compositions are possible and would be within the skill level of an artisan to consider such alternatives. Thus, the disclosure of $KNO_3$ should not limit the scope of the claims appended herewith. Such an exemplary ion exchange process can produce an initial compressive stress (iCS) at the surface of the glass sheet, an initial depth of compressive layer (iDOL) into the glass sheet, and an initial central tension (iCT) within the glass sheet.

In general, after an exemplary ion exchange process, the initial compressive stress (iCS) can exceed a predetermined (or desired) value, such as being at or greater than about 500 MPa, and can typically reach 600 MPa or higher, or even reach 1000 MPa or higher in some glasses and under some processing profiles. Alternatively, after an exemplary ion exchange process, initial depth of compressive layer (iDOL) can be below a predetermined (or desired) value, such as being at or less than about 75 μm or even lower in some glasses and under some processing profiles. Alternatively, after an exemplary ion exchange process, initial central tension (iCT) can exceed a predetermined (or desired) value, such as above a predetermined frangibility limit of the glass sheet, which can be at or above about 40 MPa, or more particularly at or above about 48 MPa in some glasses.

If the initial compressive stress (iCS) exceeds a desired value, initial depth of compressive layer (iDOL) is below a desired value, and/or initial central tension (iCT) exceeds a desired value, this can lead to undesirable characteristics in a final product made using the respective glass sheet. For example, if the initial compressive stress (iCS) exceeds a desired value (reaching for example, 1000 MPa), then facture of the glass under certain circumstances might not occur. Although this may be counter-intuitive, in some circumstances the glass sheet should be able to break, such as in an automotive glass application where the glass must break at a certain impact load to prevent injury.

Further, if the initial depth of compressive layer (iDOL) is below a desired value, then under certain circumstances the glass sheet can break unexpectedly and under undesirable circumstances. Typical ion exchange processes can result in an initial depth of compressive layer (iDOL) being no more than about 40-60 μm, which can be less than the depth of scratches, pits, etc., developed in the glass sheet during use. For example, it has been discovered that installed automotive glazing (using ion exchanged glass) can develop external scratches reaching as deep as about 75 μm or more due to exposure to abrasive materials such as silica sand, flying debris, etc., within the environment in which the glass sheet is used. This depth can exceed the typical depth of compressive layer, which can lead to the glass unexpectedly fracturing during use.

Finally, if the initial central tension (iCT) exceeds a desired value, such as reaching or exceeding a chosen frangibility limit of the glass, then the glass sheet can break unexpectedly and under undesirable circumstances. For example, it has been discovered that a 4 inch×4 inch×0.7 mm sheet of Corning Gorilla® Glass exhibits performance characteristics in which undesirable fragmentation (energetic failure into a large number of small pieces when broken) occurs when a long single step ion exchange process (8 hours at 475° C.) was performed in pure $KNO_3$. Although a DOL of about 101 μm was achieved, a relatively high CT of 65 MPa resulted, which was higher than the chosen frangibility limit (48 MPa) of the subject glass sheet.

In accordance with one or more embodiments, however, after the glass sheet has been subject to ion exchange, the glass sheet can be subjected to an annealing process 104 by elevating the glass sheet to one or more second temperatures for a second period of time. For example, the annealing process 104 can be carried out in an air environment, can be performed at second temperatures within the range of about 400-500° C., and can be performed in a second time period within the range of about 4-24 hours, such as, but not limited to, about 8 hours. The annealing process 104 can thus cause at least one of the initial compressive stress (iCS), the initial depth of compressive layer (iDOL), and the initial central tension (iCT) to be modified.

For example, after the annealing process 104, the initial compressive stress (iCS) can be reduced to a final compressive stress (fCS) which is at or below a predetermined value. By way of example, the initial compressive stress (iCS) can be at or greater than about 500 MPa, but the final compressive stress (fCS) can be at or less than about 400 MPa, 350 MPa, or 300 MPa. It is noted that the target for the final compressive stress (fCS) can be a function of glass thickness as in thicker glass a lower fCS can be desirable, and in thinner glass a higher fCS can be tolerable.

Additionally, after the annealing process 104, the initial depth of compressive layer (iDOL) can be increased to a final depth of compressive layer (fDOL) at or above the predetermined value. By way of example, the initial depth of compressive layer (iDOL) can be at or less than about 75 μm, and the final depth of compressive layer (fDOL) can be at or above about 80 μm or 90 μm, such as 100 μm or more.

Alternatively, after the annealing process 104, the initial central tension (iCT) can be reduced to a final central tension (fCT) at or below the predetermined value. By way of example, the initial central tension (iCT) can be at or above a chosen frangibility limit of the glass sheet (such as between about 40-48 MPa), and the final central tension (fCT) can be below the chosen frangibility limit of the glass sheet. Additional examples for generating exemplary ion exchangeable glass structures are described in co-pending U.S. application Ser. No. 13/626,958, filed Sep. 26, 2012 and U.S. application Ser. No. 13/926,461, filed Jun. 25, 2013 the entirety of each being incorporated herein by reference.

As noted above the conditions of the ion exchange step and the annealing step can be adjusted to achieve a desired compressive stress at the glass surface (CS), depth of compressive layer (DOL), and central tension (CT). The ion exchange step can be carried out by immersion of the glass sheet into a molten salt bath for a predetermined period of time, where ions within the glass sheet at or near the surface thereof are exchanged for larger metal ions, for example, from the salt bath. By way of example, the molten salt bath can include $KNO_3$, the temperature of the molten salt bath can be within the range of about 400-500° C., and the predetermined time period can be within the range of about 1-24 hours, and preferably between about 2-8 hours. The incorporation of the larger ions into the glass strengthens the sheet by creating a compressive stress in a near surface region. A corresponding tensile stress can be induced within a central region of the glass sheet to balance the compressive stress.

By way of further example, sodium ions within the glass sheet can be replaced by potassium ions from the molten salt bath, though other alkali metal ions having a larger atomic radius, such as rubidium or cesium, can also replace smaller alkali metal ions in the glass. According to some embodiments, smaller alkali metal ions in the glass sheet can be replaced by $Ag+$ ions. Similarly, other alkali metal salts such as, but not limited to, sulfates, halides, and the like can be used in the ion exchange process.

The replacement of smaller ions by larger ions at a temperature below that at which the glass network can relax produces a distribution of ions across the surface of the glass sheet resulting in a stress profile. The larger volume of the incoming ion produces a compressive stress (CS) on the surface and tension (central tension, or CT) in the center region of the glass. The compressive stress is related to the central tension by the following approximate relationship:

$$CS = CT\left(\frac{t - 2DOL}{DOL}\right)$$

where t represents the total thickness of the glass sheet and DOL represents the depth of exchange, also referred to as depth of compressive layer.

Any number of specific glass compositions can be employed in producing the glass sheet. For example, ion-exchangeable glasses suitable for use in the embodiments herein include alkali aluminosilicate glasses or alkali aluminoborosilicate glasses, though other glass compositions are contemplated. As used herein, "ion exchangeable" means that a glass is capable of exchanging cations located at or near the surface of the glass with cations of the same valence that are either larger or smaller in size.

For example, a suitable glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass sheets include at least 6 wt. % aluminum oxide. In a further embodiment, a glass sheet includes one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for forming hybrid glass laminates comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K2O) \leq 18$ mol. % and 2 mol. % $\leq (MgO+CaO) \leq 7$ mol. %.

In another embodiment, an alkali aluminosilicate glass comprises, consists essentially of, or consists of: 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

In a particular embodiment, an alkali aluminosilicate glass comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\Sigma \text{ modifiers}} > 1,$$

where in the ratio the components are expressed in mol. % and the modifiers are alkali metal oxides. This glass, in particular embodiments, comprises, consists essentially of, or consists of: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\Sigma \text{ modifiers}} > 1.$$

In yet another embodiment, an alkali aluminosilicate glass substrate comprises, consists essentially of, or consists of: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; wherein 12 mol. % $\leq Li_2O+Na_2O+K_2O \leq 20$ mol. % and 0 mol. % $\leq MgO+CaO \leq 10$ mol. %.

In still another embodiment, an alkali aluminosilicate glass comprises, consists essentially of, or consists of: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % $\leq MgO+CaO+SrO \leq 8$ mol. %; $(Na_2O+B_2O_3) - Al_2O_3 \leq 2$ mol. %; 2 mol. % $\leq Na_2O - Al_2O_3 \leq 6$ mol. %; and 4 mol. % $\leq (Na_2O+K_2O) - Al_2O_3 \leq 10$ mol. %. Additional compositions of exemplary glass structures are described in co-pending U.S. application Ser. No. 13/626,958, filed Sep. 26, 2012 and U.S. application Ser. No. 13/926,461, filed Jun. 25, 2013 the entirety of each being incorporated herein by reference.

Figure 2:
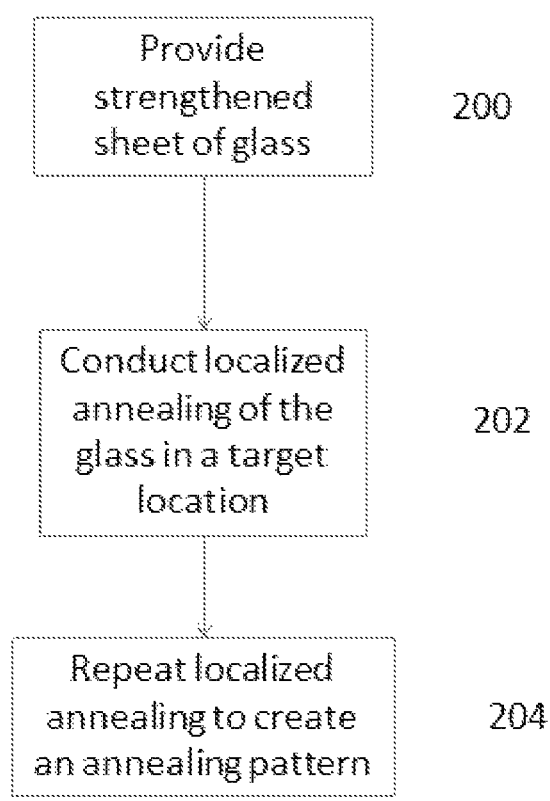
FIG. 2 is a flow diagram illustrating additional embodiments of the present disclosure.

FIG. 2 is a flow diagram illustrating additional embodiments of the present disclosure. With reference to FIG. 2, these embodiments can include in step 200 providing an article of glass that has been chemically strengthened as discussed above. The article can then be brought to another work station or kept at the same work status whereby a suitable laser or other system (e.g., microwave, induction, or the like) can be targeted onto predetermined locations of the article by moving the laser or using a lens-array to change the target from one location to the next at step 202. An exemplary laser can thus impart energy to the target on the article, heating the glass and causing the compressive stress to be reduced by an annealing action in the target area. In some embodiments, settings of the laser and the respective exposure time can be adjusted to cause a full or partial annealing effect in the target area. Once the desired effect is achieved in one target location, the laser can be re-targeted to a new location at step 204 and the process repeated to achieve a patterning of the glass article. While one laser has been described herein, the claims appended herewith should not be so limited as an array of lasers can be employed that are individually or independently controlled to produce a desired annealed pattern or provide annealing in a predetermined area on the article.

Suitable lasers for embodiments of the present disclosure include, but are not limited to, a $CO_2$ laser system, an Nd:YAG system, etc. Such lasers possess an advantage that laser energy from the respective $CO_2$ laser can be strongly absorbed by the glass so that the energy of the laser can be concentrated within the surface layer of the glass, i.e., the location where the compressive stresses of tempered glasses are localized. A $CO_2$ laser can typically penetrate about 10 or more microns into an exemplary glass surface; however, the power thereof can be controlled to achieve a desired depth of anneal in some embodiments of the present disclosure. Such embodiments can provide a surface specific absorption of laser energy whereby annealing can be localized to areas on only one surface of the exemplary tempered glass article, leaving the opposing tempered surface non-annealed.

In another embodiment of the present disclosure, localized annealing can be achieved on both sides of a glass article or laminate structure to achieve a desired and/or localized annealing on multiple tempered surfaces of the article. Exemplary laser technology or equipment can be employed to achieve such localized annealing by, for example, controlling the energy density, the dwell time, and/or the rate of heating of the glass by the laser to avoid inducing damage to the glass surface or portions thereof. In additional embodiments, the spot size of the laser can be adjusted to manage the energy density as well as optimize the amount of glass area being affected (i.e., to minimize the process cycle time). Embodiments of the present disclosure envision a large variety of annealing patterns. For example, some embodiments can employ laser technology to anneal a glass product in a grid pattern of dots or points whereby the points are about 1 cm$^2$ in area with distance between adjacent points being approximately about 1 cm. This grid pattern would be effective in meeting safety requirements for head impact while still retaining a significant amount of the original un-annealed strength of the glass in the area of the laser pattern.

While embodiments of the present disclosure have been described with regard to laser technology, the claims appended herewith should not be so limited as alternative processes can be utilized to create a pattern of annealed glass. For example, microwave systems can be employed in alternative embodiments of the present disclosure to enable selective heating of glass. Patterned annealing of a glass article with a microwave system, e.g., microwave energy, can be achieved using shielding material having a designed pattern of holes or the like which is placed between the article and the microwave energy source. In another embodiment, induction heating can be employed for localized annealing of a glass article. Patterned annealing of the article with an induction heating system can be achieved using a printed design pattern (placed or printed) on the glass article surface. This printed design pattern can thus preferentially absorb or block energy from an induction source thereby resulting in the glass article being locally annealed in the desired locations.

Different combinations of time and temperature can be employed in embodiments of the present disclosure to achieve a localized reduction of stress (i.e., annealing) of 50 MPa or more for chemically-tempered Gorilla® Glass as shown in Table 1 below.

TABLE 1

| Temperature (Celsius) | Time required for a stress reduction of 50 MPa (min) |
|---|---|
| 250 | 960 |
| 300 | 150 |
| 325 | 60 |
| 350 | 30 |
| 375 | 15 |
| 400 | 7.5 |
| 425 | 2.5 |

It should be noted that the values in Table 1 are exemplary only and should not limit the scope of the claims appended herewith as higher and varying temperatures and/or times are also envisioned. Further, if localized heating of greater than 425° C. is achieved by the laser energy source, then the time required to anneal each target can be much shorter. The processes described herein can be suitable for a range of applications. One application of particular interest is for automotive glazing applications, whereby the process enables production of glass which can pass automotive impact safety standards. Other applications can be identified by those knowledgeable in the art.

Figure 3:
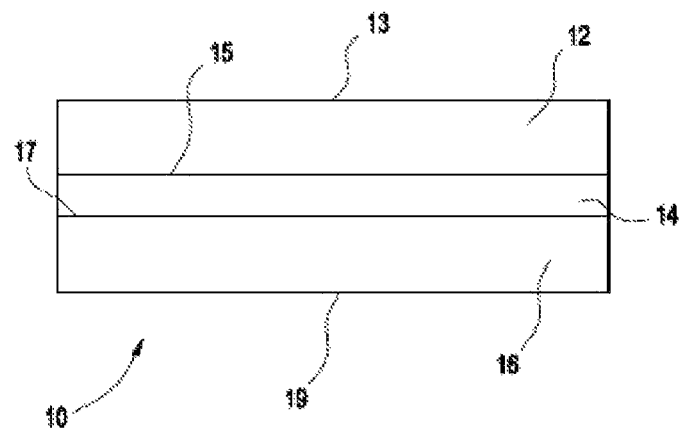
FIG. 3 is a cross sectional illustration of some embodiments of the present disclosure.
Figure 4:
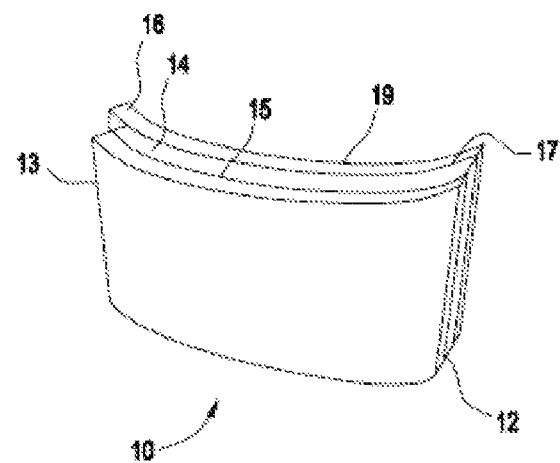
FIG. 4 is a perspective view of additional embodiments of the present disclosure.

FIG. 3 is a cross sectional illustration of some embodiments of the present disclosure. FIG. 4 is a perspective view of additional embodiments of the present disclosure. With reference to FIGS. 3 and 4, an exemplary embodiment can include two layers of chemically strengthened glass, e.g., Gorilla® Glass, that have been heat treated, ion exchanged and annealed, as described above. Exemplary embodiments can possess a surface compression or compressive stress of approximately 300 MPa and a DOL of greater than about 60 microns. In a preferred embodiment, a laminate 10 can be comprised of an outer layer 12 of glass having a thickness of less than or equal to 1.0 mm and having a residual surface CS level of between about 250 MPa to about 350 MPa with a DOL of greater than 60 microns. In another embodiment the CS level of the outer layer 12 is preferably about 300 MPa. The laminate 10 also includes a polymeric interlayer 14 and an inner layer of glass 16 also having a thickness of less than or equal to 1.0 mm and having a residual surface CS level of between about 250 MPa to about 350 MPa with a DOL of greater than 60 microns. In another embodiment the CS level of the inner layer 16 is preferably about 300 MPa. In one embodiment, an interlayer 14 can have a thickness of approximately 0.8 mm. Exemplary interlayers 14 can include, but are not limited to poly-vinyl-butyral or other suitable polymeric materials. In additional embodiments, any of the surfaces of the outer and/or inner layers 12, 16 can be acid etched to improve durability to external impact events. For example, in one embodiment, a first surface 13 of the outer layer 12 is acid etched and/or another surface 17 of the inner layer is acid etched. In another embodiment, a first surface 15 of the outer layer is acid etched and/or another surface 19 of the inner layer is acid etched. Such embodiments can thus provide a laminate construction that is substantially lighter than conventional laminate structures and which conforms to regulatory impact requirements.

In another embodiment of the present disclosure, at least one layer of thin but high strength glass can be used to construct an exemplary laminate structure. In such an embodiment, chemically strengthened glass, e.g., Gorilla® Glass can be used for the outer layer 12 and/or inner layer 16 of glass for an exemplary laminate 10. In another embodiment, the inner layer 16 of glass can be conventional soda lime glass, annealed glass, or the like. Exemplary thicknesses of the outer and/or inner layers 12, 16 can range in thicknesses from 0.55 mm to 1.5 mm to 2.0 mm or more. Additionally, the thicknesses of the outer and inner layers 12, 16 can be different in a laminate structure 10. Exemplary glass layers can be made by fusion drawing, as described in U.S. Pat. Nos. 7,666,511, 4,483,700 and 5,674,790, the entirety of each being incorporated herein by reference, and then chemically strengthening such drawn glass. Exemplary glass layers 12, 16 can thus possess a deep DOL of CS and can present a high flexural strength, scratch resistance and impact resistance. Exemplary embodiments can also include acid etched or flared surfaces to increase the impact resistance and increasing the strength of such surfaces by reducing the size and severity of flaws on these surfaces. If etched immediately prior to lamination, the strengthening benefit of etching or flaring can be maintained on surfaces bonded to the inter-layer.

One embodiment of the present disclosure is directed to a laminate structure having a first glass layer, a second glass layer, and at least one polymer interlayer intermediate the first and second glass layers. The first glass layer can be comprised of a thin, chemically strengthened glass having a surface compressive stress of between about 250 MPa and about 350 MPa and a depth of layer (DOL) of CS greater than about 60 μm. In another embodiment, the second glass layer can be comprised of a thin, chemically strengthened glass having a surface compressive stress of between about 250 MPa and about 350 MPa and a depth of layer (DOL) of CS greater than about 60 μm. Preferable surface compressive stresses of the first and/or second glass layers can be approximately 300 MPa. In some embodiments, the thicknesses of the first and/or second glass layers can be a thickness not exceeding 1.5 mm, a thickness not exceeding 1.0 mm, a thickness not exceeding 0.7 mm, a thickness not exceeding 0.5 mm, a thickness within a range from about 0.5 mm to about 1.0 mm, a thickness from about 0.5 mm to about 0.7 mm. Of course, the thicknesses and/or compositions of the first and second glass layers can be different from each other. Additionally, the surface of the first glass layer opposite the interlayer can be acid etched, and the surface of the second glass layer adjacent the interlayer can be acid etched. Exemplary polymer interlayers include materials such as, but not limited to, poly vinyl butyral (PVB), polycarbonate, acoustic PVB, ethylene vinyl acetate (EVA), thermoplastic polyurethane (TPU), ionomer, a thermoplastic material, and combinations thereof.

Another embodiment of the present disclosure is directed to a laminate structure having a first glass layer, a second glass layer, and at least one polymer interlayer intermediate the first and second glass layers. The first and second glass layers can be comprised of a thin, chemically strengthened glass having a surface compressive stress of between about 250 MPa and about 350 MPa and a depth of compressive layer (DOL) of greater than about 60 μm. Preferable surface compressive stresses of the first and/or second glass layers can be approximately 300 MPa. In some embodiments, the thicknesses of the first and/or second glass layers can be a thickness not exceeding 1.5 mm, a thickness not exceeding 1.0 mm, a thickness not exceeding 0.7 mm, a thickness not exceeding 0.5 mm, a thickness within a range from about 0.5 mm to about 1.0 mm, a thickness from about 0.5 mm to about 0.7 mm. Of course, the thicknesses of the first and second glass layers can be different from each other. Additionally, the surface of the first glass layer opposite the interlayer can be acid etched, and the surface of the second glass layer adjacent the interlayer can be acid etched. In another embodiment, the surface of the first glass layer in contact with the interlayer can be acid etched, and the surface of the second glass layer opposite the interlayer can be acid etched. Exemplary polymer interlayers include materials such as, but not limited to, poly vinyl butyral (PVB), polycarbonate, acoustic PVB, ethylene vinyl acetate (EVA), thermoplastic polyurethane (TPU), ionomer, a thermoplastic material, and combinations thereof. The first or second glass layer can have a central tension (CT) that is below a predetermined frangibility limit.

Concerns related to damage levels of impact injuries to a vehicle occupant has required a relatively easier breakage for automotive glazing products. For example, in ECE R43 Revision 2, there is a requirement that, when the laminate is impacted from an internal object (by an occupant's head during a collision), the laminate should fracture so as to dissipate energy during the event and minimize risk of injury to the occupant. This requirement has generally prevented direct use of high strength glass as both plies of a laminate structure. It has been discovered through extensive headform testing that exemplary laminate structures according to embodiments of the present disclosure having one or more layers of chemically strengthened glass with a residual surface compressive stress level of about 250 MPa to about 350 MPa, and preferably about 300 MPa, and with glass thicknesses of approximately 0.7 mm for each layer, consistently comply with these test requirements.

With continued reference to FIG. 4, another exemplary laminate structure 10 embodiment is illustrated having an outer layer 12 of glass with a thickness of less than or equal to 1.0 mm and having a residual surface CS level of between about 250 MPa to about 350 MPa with a DOL of greater than 60 microns, a polymeric interlayer 14, and an inner layer of glass 16 also having a thickness of less than or equal to 1.0 mm and having a residual surface CS level of between about 250 MPa to about 350 MPa with a DOL of greater than 60 microns. As illustrated, the laminate structure 10 can be flat or formed to three-dimensional shapes by bending the formed glass into a windshield or other glass structure utilized in vehicles.

Figure 5:
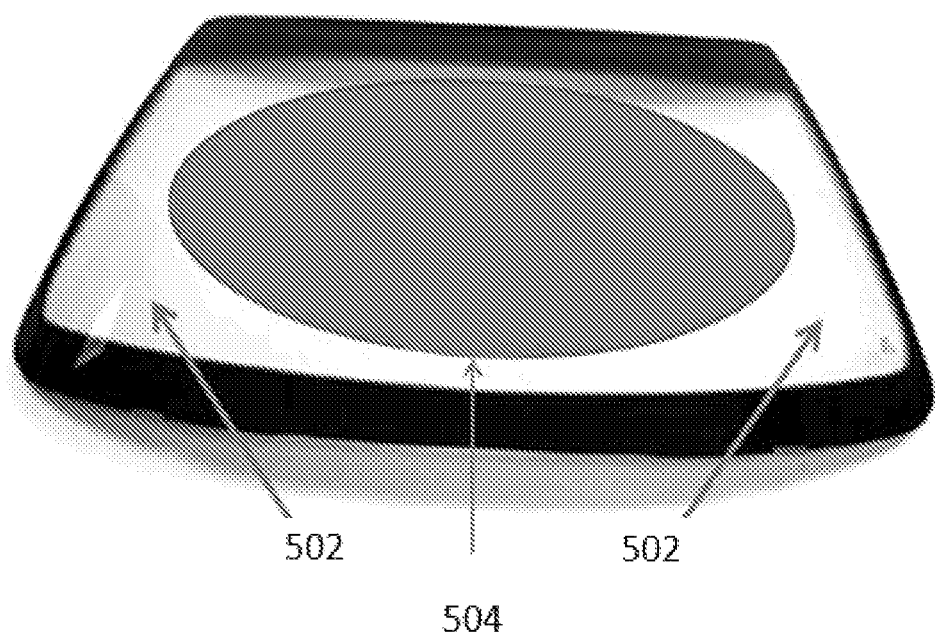
FIG. 5 is another perspective view of FIGS. 3 and 4 showing regions where reduced and full strength are desired.
Figure 6:
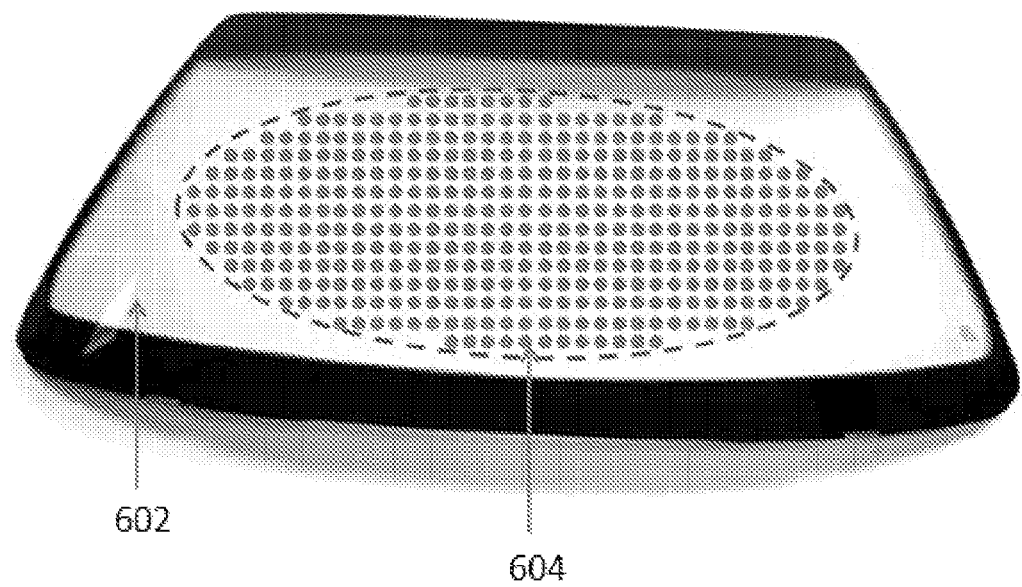
FIG. 6 is a perspective view of a glass article with an array of localized annealed portions.

FIG. 5 is another perspective view of FIGS. 3 and 4 showing regions where reduced and full strength are desired. FIG. 6 is a perspective view of a glass article with an array of localized annealed portions. With reference to FIGS. 5 and 6, a glass article or laminate structure can be, but is not limited to, a windshield or other suitable glass article as described above. A first area 504 of the glass article can be locally annealed to meet head form testing or other criteria whereas a second area 502, e.g., the edge sections of the windshield or other article, can maintain its original strength and characteristics (see, e.g., FIGS. 3 and 4). The first area 504 can be targeted by moving the laser or using a lens-array to change the target from one location to a second location. An exemplary laser can be employed to impart energy to the target on the article, heating the glass and causing the compressive stress to be reduced by an annealing action in the target area. As noted above, inductive heating and/or microwave heating mechanisms can also be employed thus the claims appended herewith should not be limited solely to localized annealing by laser technology. Once the desired full or partial annealing is achieved in one target location, the laser can be re-targeted to a new location and the process repeated to achieve a patterning 604 of the glass article. Such embodiments can provide a surface specific absorption of laser energy whereby annealing can be localized to predetermined areas 604 on one surface of the exemplary glass article, leaving the other areas 602 of the glass article (including opposing surfaces, not shown) non-locally annealed. Of course, localized annealing can be achieved on both sides of the glass article or laminate structure to achieve a desired and/or localized annealing on multiple tempered surfaces of the article to thereby achieve a plurality of differing surface compressive stresses and depth of layers of compressive stress in a single glass article. Furthermore, it is envisioned that the level of annealing imparted by a respective laser(s) (or microwave or induction source) can be modified from successive points or spots in the first area 504 to create plural points or spots, or sets thereof, having different levels of annealing in the first area 504 (and hence differing levels of surface compressive stress and depth of layer of compressive stress between spots or points in the first area 504).

Exemplary laser technology or equipment can be employed to achieve such localized annealing by, for example, controlling the energy density, the dwell time, and/or the rate of heating of the glass by the laser to avoid inducing damage to the glass surface or portions thereof. In additional embodiments, the spot size of the laser can be adjusted to manage the energy density as well as optimize the amount of glass area being affected (i.e., to minimize the process cycle time). Embodiments of the present disclosure envision a large variety of annealing patterns thus the depicted array of points or dots in FIG. 6 should not limit the scope of the claims appended herewith. For example, some embodiments can employ laser, microwave or inductive technology to anneal a glass product in a pattern of rows, ovals, points or other geometric figures or arrays with varying distance between individual targeted areas. Regardless, the grid pattern formed by such geometries should be effective in meeting safety requirements for head impact while retaining a significant amount of the original un-annealed strength of the glass in the area of the laser pattern.

Embodiments of the present disclosure provide an ability to reduce the strength of the glass in specific areas of a glass article, to make the article compliant with safety standards (such as head impact) while maintaining the full strength of the glass in other areas of the article (e.g., near the edges of the article). In non-limiting embodiments employing lasers, the laser equipment can be programmed to expose certain areas and not expose other areas, thereby eliminating the need for additional tooling to cause the pattern of annealed glass. In these embodiments, the amount of annealing can be readily adjusted by changing the laser parameters, such as increasing or decreasing the power of the laser. By creating a pattern of annealed glass, instead of annealing a large continuous area of glass, glass articles according to embodiments of the present disclosure can retain more of its original strength while the locally annealed regions can be a failure origin under the stress of an impact event (such as head impact). Additional embodiments also provide the advantage of localized annealing on one or both surfaces of a glass article.

Some embodiments of the present disclosure provide a method of providing locally annealed regions for a glass article. The method includes providing a strengthened glass article having a first surface compressive stress and a first depth of layer of compressive stress and targeting first portions of the glass article on a first side thereof. The method also includes annealing the targeted first portions to a second surface compressive stress and a second depth of layer of compressive stress and repeating steps the targeting and annealing to create a pattern of annealed portions of the glass article on the first side thereof. In additional embodiments, the second surface compressive stress and the second depth of layer of compressive stress are less than the first surface compressive stress and the first depth of layer of compressive stress, respectively. The step of annealing can further comprise focusing a laser on the targeted first portions for a predetermined energy density and dwell time to avoid inducing damage to the glass article. Exemplary lasers include, but are not limited to, a $CO_2$ laser or an Nd:YAG laser. Of course, other methods of localized annealed can be employed such as, but not limited to, selectively heating the targeted first portions using microwave energy or selectively heating the targeted first portions using an induction source. Any one of these other methods can also employ shielding non-targeted portions of the glass article with shielding material or preferentially absorbing or blocking energy from the induction source, as applicable. In other embodiments, the method includes targeting third portions of the glass article on a second side thereof, annealing the targeted third portions to a third surface compressive stress and a third depth of layer of compressive stress, and repeating these additional targeting and annealing steps to create a pattern of annealed portions of the glass article on the second side thereof. In some embodiments, the second surface compressive stress and the third surface compressive stress are different. In other embodiments, the second depth of layer of compressive stress and the third depth of layer of compressive stress are different. An exemplary strengthened glass article can include one or more glass layers and an interlayer. Additionally, an exemplary strengthened glass article can include a chemically strengthened glass layer, a thermally strengthened glass layer, or a combination thereof.

Additional embodiments of the present disclosure provide a laminate structure having a first glass layer, a second glass layer, and at least one polymer interlayer intermediate the first and second glass layers. The first glass layer can be comprised of a strengthened glass having a first portion with a first surface compressive stress and a first depth of layer of compressive stress and a second portion with a second surface compressive stress and a second depth of layer of compressive stress. The strengthened glass of the first layer and/or second layer can be chemically strengthened glass or thermally strengthened glass. In one embodiment, the first surface compressive stress can be between about 250 MPa and about 350 MPa and the first depth of layer of compressive stress can be greater than about 60 µm. In another embodiment, the second surface compressive stress can be less than the first surface compressive stress and the second depth of layer of compressive stress can be less than the first depth of layer of compressive stress. In some embodiments, the second glass layer can be comprised of a strengthened glass having a third portion with a third surface compressive stress and a third depth of layer of compressive stress and a fourth portion with a fourth surface compressive stress and a fourth depth of layer of compressive stress. In another embodiment, the third surface compressive stress can be between about 250 MPa and about 350 MPa and the third depth of layer of compressive stress can be greater than about 60 µm. In additional embodiments, the fourth surface compressive stress can be less than the third surface compressive stress and the fourth depth of layer of compressive stress can be less than the third depth of layer of compressive stress. Of course, the first and third surface compressive stresses can be different, and the first and third depth of layer of compressive stresses can be different. Exemplary thicknesses of the first and second glass layers can be, but are not limited to, a thickness not exceeding 1.5 mm, a thickness not exceeding 1.0 mm, a thickness not exceeding 0.7 mm, a thickness not exceeding 0.5 mm, a thickness within a range from about 0.5 mm to about 1.0 mm, a thickness from about 0.5 mm to about 0.7 mm. In some embodiments, the thicknesses and/or compositions of the first and second glass layers can be different. An exemplary polymer interlayer can be, but is not limited to, poly vinyl butyral (PVB), polycarbonate, acoustic PVB, ethylene vinyl acetate (EVA), thermoplastic polyurethane (TPU), ionomer, a thermoplastic material, and combinations thereof. An exemplary, non-limiting thickness for an interlayer can be approximately 0.8 mm.

Further embodiments of the present disclosure provide a laminate structure having a first glass layer, a second glass layer, and at least one polymer interlayer intermediate the first and second glass layers. The first glass layer can be comprised of a strengthened glass having a first portion with a first surface compressive stress and a first depth of layer of compressive stress and a second portion with a second surface compressive stress and a second depth of layer of compressive stress. The second glass layer can be comprised of a strengthened glass having a third portion with a third surface compressive stress and a third depth of layer of compressive stress and a fourth portion with a fourth surface compressive stress and a fourth depth of layer of compressive stress. The strengthened glass of the first layer and/or second layer can be chemically strengthened glass or thermally strengthened glass. In one embodiment, the first surface compressive stress can be between about 250 MPa and about 350 MPa and the first depth of layer of compressive stress can be greater than about 60 μm. In another embodiment, the second surface compressive stress can be less than the first surface compressive stress and the second depth of layer of compressive stress can be less than the first depth of layer of compressive stress. In another embodiment, the third surface compressive stress can be between about 250 MPa and about 350 MPa and the third depth of layer of compressive stress can be greater than about 60 μm. In additional embodiments, the fourth surface compressive stress can be less than the third surface compressive stress and the fourth depth of layer of compressive stress can be less than the third depth of layer of compressive stress. Of course, the first and third surface compressive stresses can be different, and the first and third depth of layer of compressive stresses can be different. Exemplary thicknesses of the first and second glass layers can be, but are not limited to, a thickness not exceeding 1.5 mm, a thickness not exceeding 1.0 mm, a thickness not exceeding 0.7 mm, a thickness not exceeding 0.5 mm, a thickness within a range from about 0.5 mm to about 1.0 mm, a thickness from about 0.5 mm to about 0.7 mm. In some embodiments, the thicknesses and/or compositions of the first and second glass layers can be different. An exemplary polymer interlayer can be, but is not limited to, poly vinyl butyral (PVB), polycarbonate, acoustic PVB, ethylene vinyl acetate (EVA), thermoplastic polyurethane (TPU), ionomer, a thermoplastic material, and combinations thereof. An exemplary, non-limiting thickness for an interlayer can be approximately 0.8 mm.

While this description can include many specifics, these should not be construed as limitations on the scope thereof, but rather as descriptions of features that can be specific to particular embodiments. Certain features that have been heretofore described in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and can even be initially claimed as such, one or more features from a claimed combination can in some cases be excised from the combination, and the claimed combination can be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing can be advantageous.

As shown by the various configurations and embodiments illustrated in FIGS. 1-6, various embodiments for methods for localized annealing of chemically strengthened glass have been described.

While preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof

We claim:
1. A laminate structure comprising:
a first glass layer;
a second glass layer; and
at least one polymer interlayer intermediate the first and second glass layers;
wherein the first glass layer is comprised of a strengthened glass having a first portion with a first surface compressive stress and a first depth of layer of compressive stress and a second portion with a second surface compressive stress and a second depth of layer of compressive stress; and
wherein either one or both the first glass layer and the second glass layer comprise a pattern of annealed portions.
2. The laminate structure of claim 1, wherein the strengthened glass of the first layer is chemically strengthened glass or thermally strengthened glass, and wherein the first surface compressive stress is between about 250 MPa and about 350 MPa and the first depth of layer of compressive stress is greater than about 60 μm.
3. The laminate structure of claim 2, wherein the second surface compressive stress is less than the first surface compressive stress and the second depth of layer of compressive stress is less than the first depth of layer of compressive stress.
4. The laminate structure of claim 1, wherein the second glass layer is comprised of a strengthened glass having a third portion with a third surface compressive stress and a third depth of layer of compressive stress and a fourth portion with a fourth surface compressive stress and a fourth depth of layer of compressive stress.
5. The laminate structure of claim 4, wherein the strengthened glass of the second layer is chemically strengthened glass or thermally strengthened glass, and wherein the third surface compressive stress is between about 250 MPa and about 350 MPa and the third depth of layer of compressive stress is greater than about 60 μm.
6. The laminate structure of claim 4, wherein the fourth surface compressive stress is less than the third surface compressive stress and the fourth depth of layer of compressive stress is less that the third depth of layer of compressive stress.
7. The laminate structure of claim 4 wherein the first and third surface compressive stresses are different and wherein the first and third depth of layer of compressive stresses are different.
8. The laminate structure of claim 1, wherein the thicknesses of the first and second glass layers are selected from the group consisting of a thickness not exceeding 1.5 mm, a thickness not exceeding 1.0 mm, a thickness not exceeding 0.7 mm, a thickness not exceeding 0.5 mm, a thickness within a range from about 0.5 mm to about 1.0 mm, a thickness from about 0.5 mm to about 0.7 mm.

9. An automotive windshield comprising:
a glass laminate structure comprising:
  at least one strengthened glass layer;
  a first area, wherein the first area comprises a pattern of annealed portions; and
  a second area;
wherein the first area has a surface compressive stress and a depth of layer of compression that are lower that the second area.

10. The laminate structure of claim 9, wherein the at least one strengthened glass layer includes chemically strengthened glass.

11. The laminate structure of claim 9, wherein the at least one strengthened glass layer is about 0.5 mm to about 1.0 mm thick.

12. The laminate structure of claim 9, wherein the glass laminate structure includes at least two glass layers coupled to opposing sides of at least one polymer interlayer.

13. The laminate structure of claim 12, wherein each of the at least two glass layers includes chemically strengthened glass.

14. The laminate structure of claim 9, wherein the first area corresponds to a head impact area of the automotive windshield.

15. The laminate structure of claim 9, wherein the surface compressive stress and the depth of layer of compression of the first area are reduced sufficiently compared to the surface compressive stress and the depth of layer of compression of the second area for the automotive windshield to meet head-impact safety requirements.

16. The laminate structure of claim 9, wherein the surface compressive stress of the first area is about 250 MPa to about 350 MPa.

17. The laminate structure of claim 9, wherein the depth of layer of compressive stress of the first area is at least about 60 μm.

18. An automotive glazing comprising:
a glass laminate structure comprising:
  at least one strengthened glass layer;
  a first area of the strengthened glass layer; and
  a second area of the strengthened glass layer;
wherein the first area of the automotive glazing comprises a pattern of annealed portions of the strengthened glass layer; and
wherein the second area is stronger than the first area.

* * * * *

UNITED STATES PATENT AND TRADEMARK OFFICE
CERTIFICATE OF CORRECTION

PATENT NO. : 9,908,805 B2  
APPLICATION NO. : 14/913890  
DATED : March 6, 2018  
INVENTOR(S) : Thomas Michael Cleary et al.

Page 1 of 1

It is certified that error appears in the above-identified patent and that said Letters Patent is hereby corrected as shown below:

On the Title Page

In Column 2, item (56), Other Publications, Line 1, delete "Patenets" and insert -- Patents --, therefor.

On Page 2, in Column 2, item (56), Other Publications, Line 1, delete "Photonices," and insert -- Photonics, --, therefor.

In the Claims

In Column 17, Line 8 (approx.), Claim 9, delete "that" (2nd Occurrence) and insert -- than --, therefor.

Signed and Sealed this  
Third Day of December, 2019

Andrei Iancu  
*Director of the United States Patent and Trademark Office*